US006796688B2

(12) United States Patent
Huang

(10) Patent No.: US 6,796,688 B2
(45) Date of Patent: Sep. 28, 2004

(54) WATERPROOF CHRISTMAS LIGHT BULB

(75) Inventor: Kuo-Hao Huang, Taipei (TW)

(73) Assignee: Shining Blick Enterprises Co., Ltd., Taipei (TW)

( * ) Notice: Subject to any disclaimer, the term of this patent is extended or adjusted under 35 U.S.C. 154(b) by 8 days.

(21) Appl. No.: 10/200,855

(22) Filed: Jul. 23, 2002

(65) Prior Publication Data

US 2004/0017684 A1 Jan. 29, 2004

(51) Int. Cl.[7] .......................... B60Q 3/04; H01J 17/18; H01J 1/52

(52) U.S. Cl. ...................... 362/362; 362/363; 362/803; 362/806; 313/623; 313/626; 315/85; 315/56; 315/185 S

(58) Field of Search ............................... 362/362, 363, 362/803, 806, 267, 374, 378, 376; 313/623, 626, 800; 315/85, 185 S, 56, 58, 57

(56) References Cited

U.S. PATENT DOCUMENTS 5,626,415 A * 5/1997 Huang ...................... 362/226
5,869,932 A * 2/1999 Choi ......................... 315/76
5,915,826 A * 6/1999 Lin .......................... 362/226
6,022,241 A * 2/2000 Lin .......................... 439/419
2002/0093279 A1 * 7/2002 Chen ................... 313/318.01

* cited by examiner

*Primary Examiner*—Tuyet T. Vo
(74) *Attorney, Agent, or Firm*—Alan D. Kamrath; Nikolai & Mersereau, P.A.

(57) ABSTRACT

A waterproof Christmas light bulb includes a connection tube formed on top of the socket and having a diameter smaller than a diameter of the socket so that a step is formed at a joint between the socket and the connection tube. A bulb is partially received in the connection tube. Two wires are oppositely formed on a side of the bulb, and a dividing plate is integrally formed on a bottom of the bulb. An O ring rests on and is supported by the step. An enclosure is securely connected to the connection tube by a securing device so that the O ring is securely clamped between the enclosure and the step of the socket to complete a waterproof engagement between the enclosure and the socket. A plug is received in the socket to have a waterproof engagement with the cables and the inner periphery of the hollow socket.

20 Claims, 11 Drawing Sheets

WATERPROOF CHRISTMAS LIGHT BULB

BACKGROUND OF THE INVENTION

1. Field of the Invention

The present invention relates to a waterproof Christmas light bulb, and more particularly to a Christmas light bulb having a securing device provided between the enclosure and the socket to secure the engagement between the enclosure and the socket to prevent water from entering the socket and a plug received in the bottom of the socket so that water is prevented from seeping into the socket.

2. Description of Related Art

A conventional Christmas light bulb includes a bulb with a flange integrally formed on a mediate portion of the light bulb and a hollow socket with two cables extending out from a bottom of the socket.

When the bulb is inserted into the socket, the cables electrically connect with two contacting wires (not shown) of the bulb and the flange seats on a top peripheral edge of the socket. The objective of the flange aims to prevent water from entering the socket so as to accomplish the purpose of waterproofing the Christmas light bulb. However, it is noted from the structure that when the flange engages the top peripheral edge of the socket, gaps exist. Because of the gaps, water and moisture easily seep into the socket and thus cause an electrical short. Especially, because the Christmas light bulb is normally used outdoors, the Christmas light bulb easily becomes wet so that the conventional Christmas light bulb needs to have an enhanced waterproof structure.

To overcome the shortcomings, the present invention tends to provide an improved waterproof device for a Christmas light bulb to mitigate and obviate the aforementioned problems.

SUMMARY OF THE INVENTION

The primary objective of the present invention is to provide an improved waterproof device for a Christmas light bulb. The waterproof device includes a securing device provided between the bulb and the socket and a plug inserted into the socket.

The securing device secures engagement between the bulb and the socket and the plug prevents water from seeping into the socket from a bottom of the socket. Thus, with the combination of the securing device and the plug, the Christmas light bulb is waterproof.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
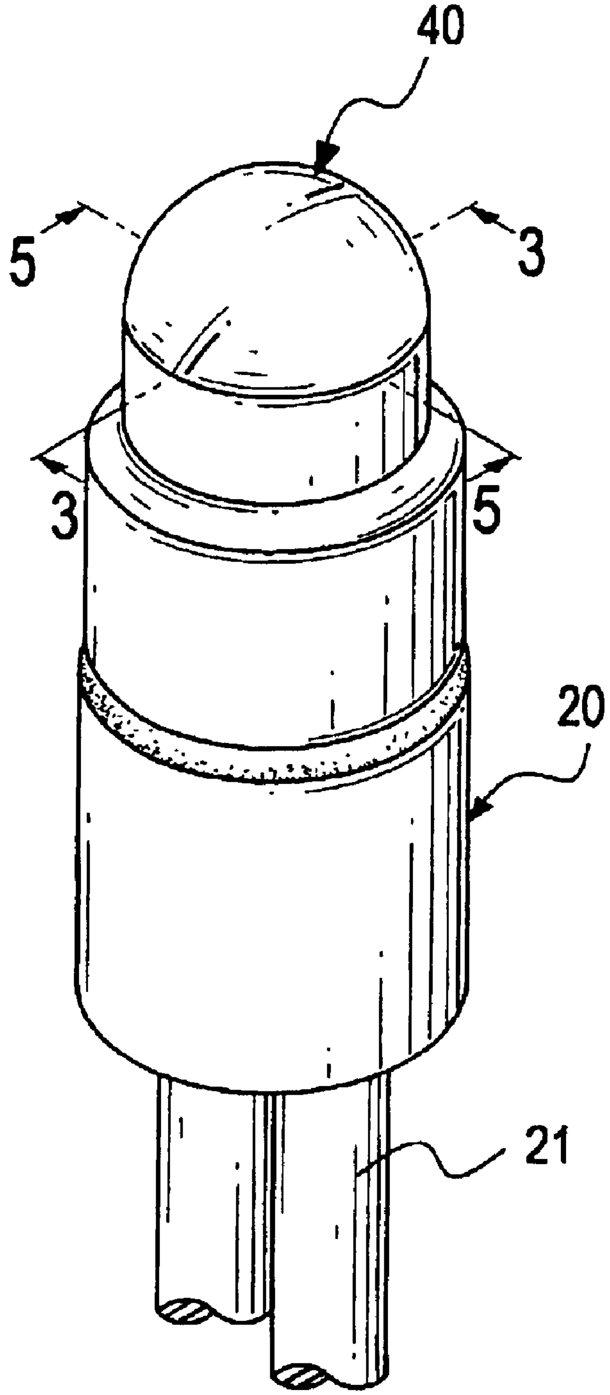
FIG. 1 is a perspective view of the Christmas light bulb of the present invention.
Figure 2:
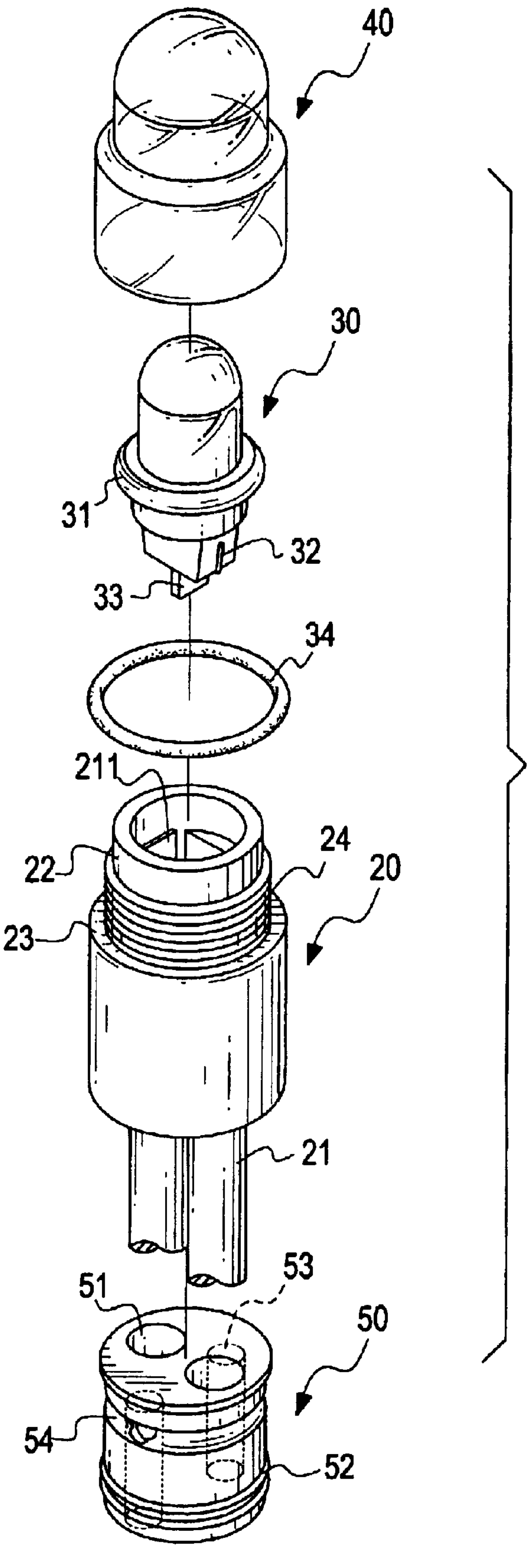
FIG. 2 is an exploded perspective view of the Christmas light bulb in FIG. 1.

With reference to FIGS. 1 and 2, the waterproof Christmas light bulb in accordance with the present invention includes a hollow socket (20), a bulb (30), an enclosure (40) and a plug (50).

The socket (20) has two cables (21) extending out of the socket (20) from a bottom of the socket (20) and each cable (21) has a contacting plate (211) formed on a distal end of the cable (21) and securely attached to an inner face of the socket (20). A connection tube (22) is formed on a top of the socket (20) and has a diameter smaller than a diameter of the socket (20) so that a step (23) is formed at a joint between the socket (20) and the connection tube (22). An outer threading (24) is formed on an outer periphery of the connection tube (22).

The bulb (30) has a flange (31) with a diameter the same as that of the connection tube (22), two wires (32) and a dividing plate (33). Each wire (32) is oppositely formed on a side of the bulb (30) to correspond to the two contacting plates (211), respectively. The dividing plate (33) is integrally formed on a bottom of the bulb (30) to separate the two wires (32) to avoid an electrical short. An O ring (34) is provided between the bulb (30) and the socket (20).

Figure 3:
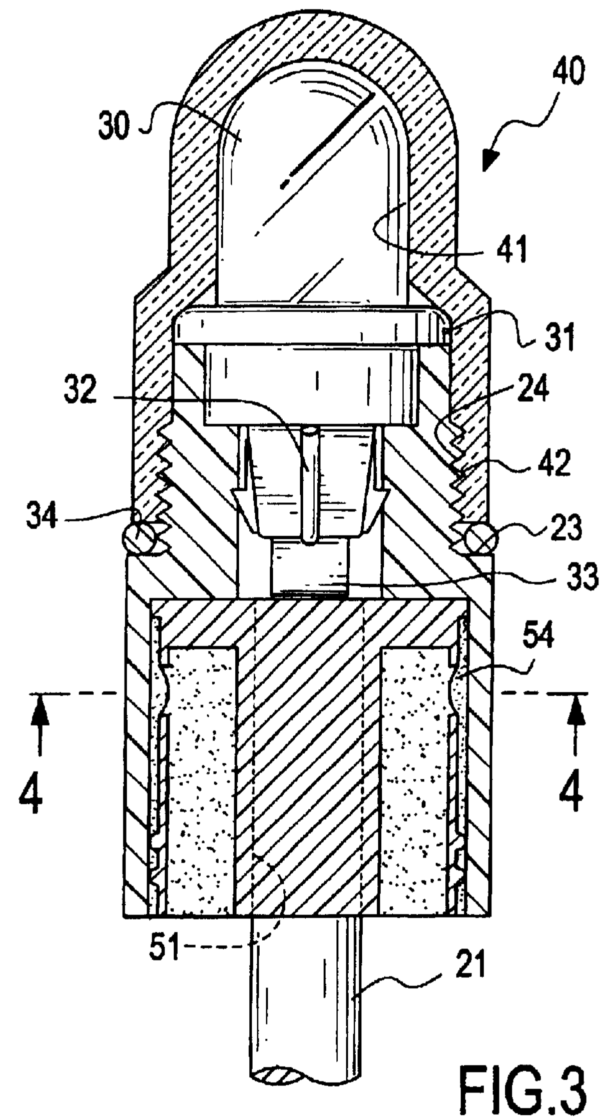
FIG. 3 is a cross sectional view taken along line 3—3 in FIG. 1.

The enclosure (40) has a closed end and an open end, and the bulb (30) is configured to be able to be snugly received in an inside (41) of the enclosure (40), as shown in FIG. 3. An inner threading (42) is formed on an inner periphery of the enclosure (40) to correspond to the outer threading (24) of the connection tube (22).

The plug (50) is cylindrical and has two through holes (51) defined to correspond to the two cables (21) and two L shaped glue holes (53). Each of the L shaped glue holes (53) has a first end communicating with a side face of the plug (50) and a second end communicating with a bottom face of the plug (50). An annular groove (54) is defined in an outer periphery of the plug (50) to communicate with the first end of the L shaped glue hole (53).

Figure 4:
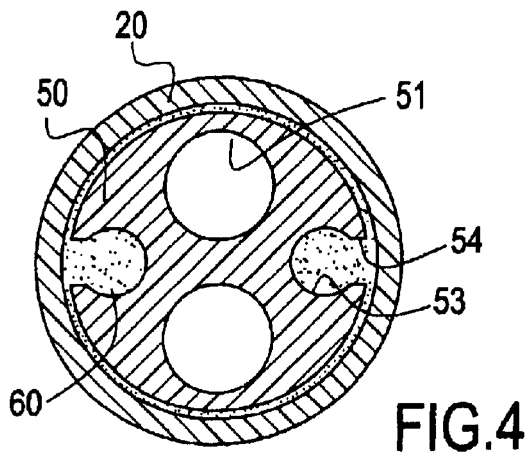
FIG. 4 is a cross sectional view taken along line 4—4 in FIG. 3.
Figure 5:
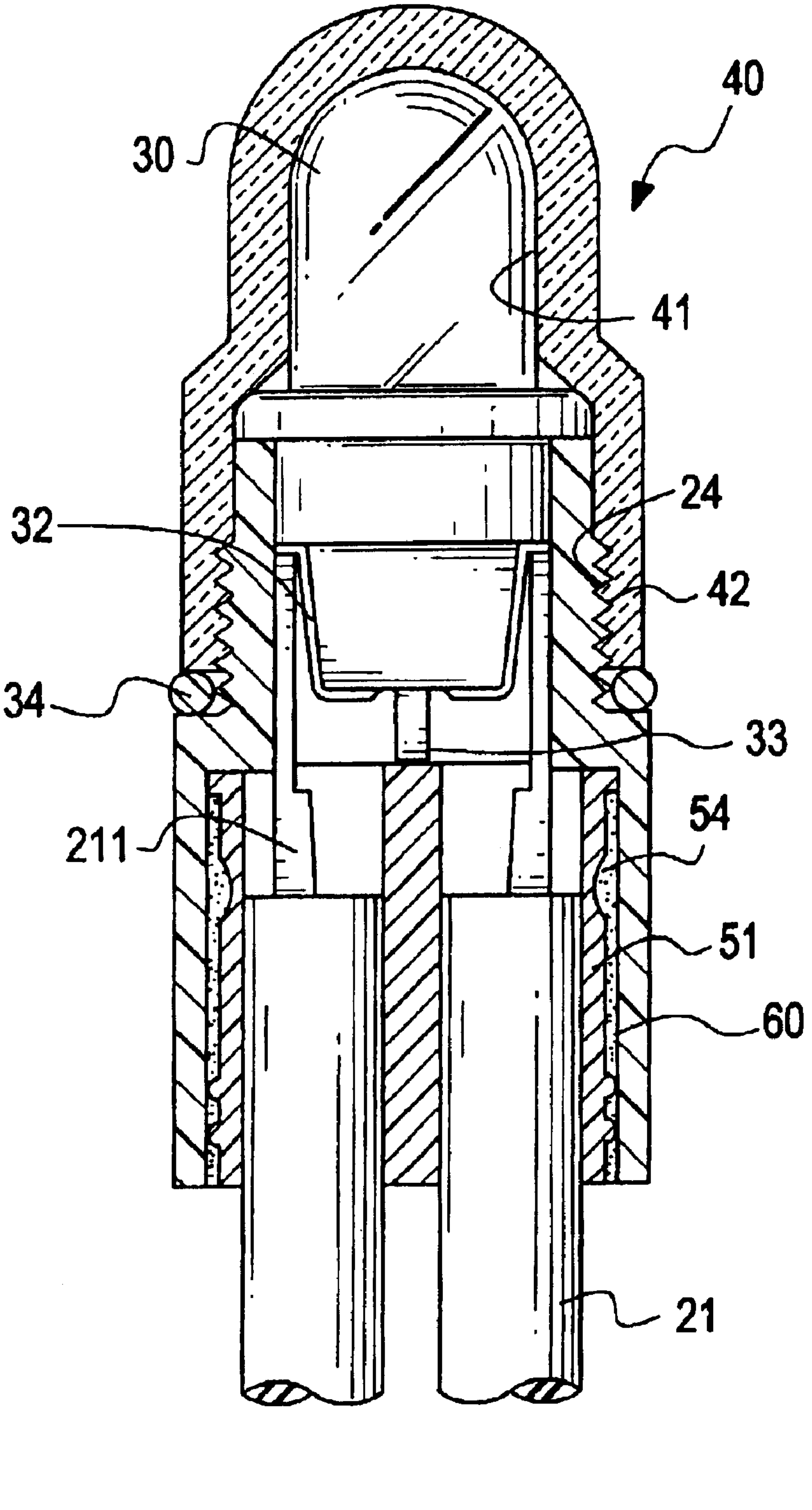
FIG. 5 is a cross sectional view taken along line 5—5 in FIG. 1.

With reference to FIGS. 3 to 5, during assembly of the Christmas light bulb, the bulb (30), due to the flange (31), is supported on top of the connection tube (22). The O ring (34) is then placed on the step (23). Next, the enclosure (40) is threadingly connected to the socket (20). Because of the combination of the inner threading (42) of the enclosure (40) and the outer threading (24) of the socket (20), the O ring (34) is securely clamped between the enclosure (40) and the socket (20) so that a waterproof engagement between the enclosure (40) and the socket (20) is completed.

Furthermore, the user is able to insert the plug (50) into the socket (20) from the bottom of the socket (20). While inserting the plug (50) into the socket (20), the two cables (21) extend through the two through holes (51). Thereafter, the user is able to fill the L shaped glue holes (53) with glue (60). As described earlier, one end of each of the L shaped glue holes (53) communicates with the annular groove (54) on the side fare of the plug (50), and the other end of the L shaped glue hole (53) communicates with the bottom face of the plug (50). Therefore, the glue (60) is injected into the L shaped glue holes (53) from the second ends of the two L shaped glue holes (53). After the glue (60) fills the L shaped glue holes (53) and the groove (54), the glue (60) overflows and flows to the outer periphery of the plug (50), which fills the gap between the outer periphery of the plug (50) and the inner periphery of the socket (20). Because the plug (50) is made of a waterproof material and is resilient, the definition of each of the through holes (51) when disassembled may have a diameter smaller than a diameter of the cable (21) so that the engagement between the outer periphery of the cable (21) and an inner periphery defining the through hole (51) is waterproof. After the foregoing assembly is finished, not only the upper portion of the Christmas light bulb is waterproof, but also the lower portion of the Christmas light bulb is waterproof.

Figure 6:
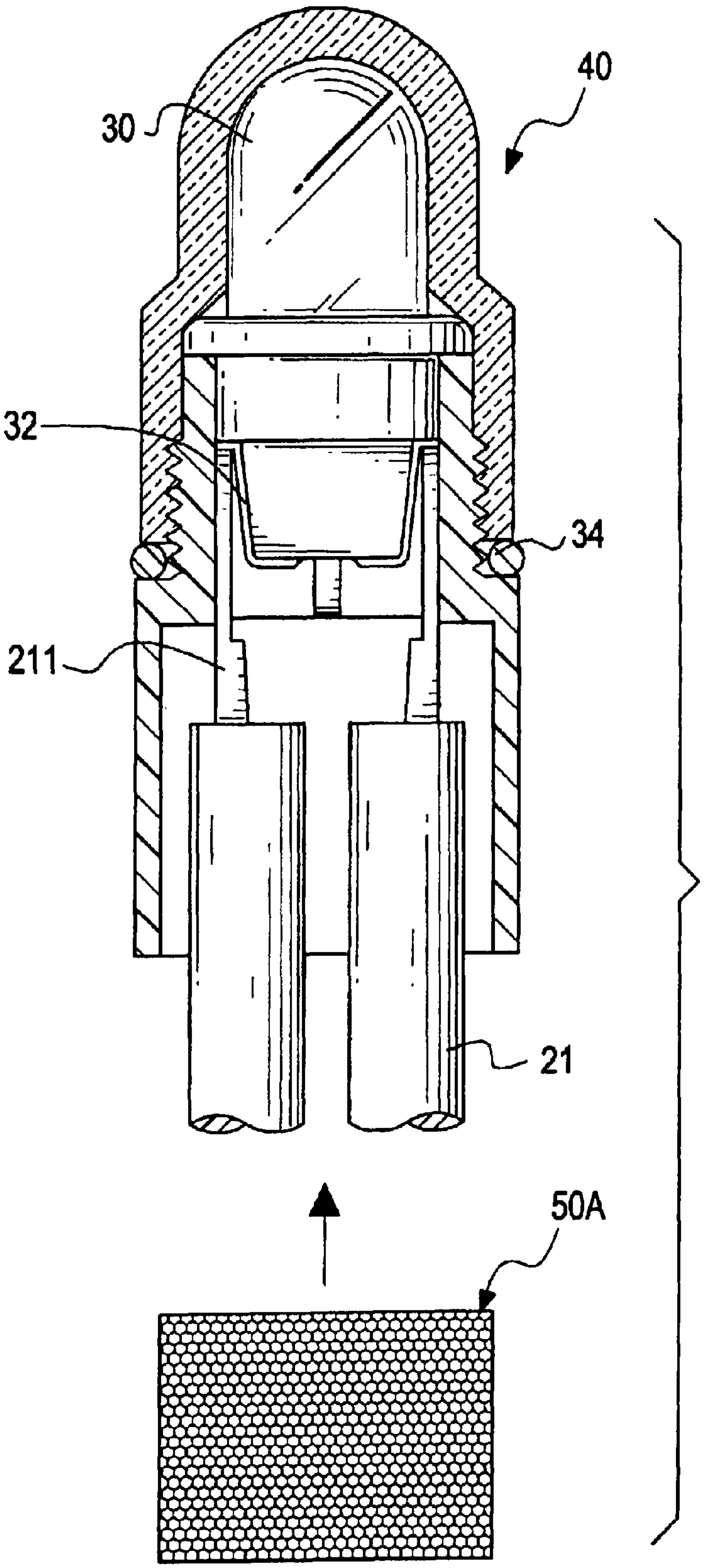
FIG. 6 is a schematic view showing a different embodiment of the plug of the present invention.
Figure 7:
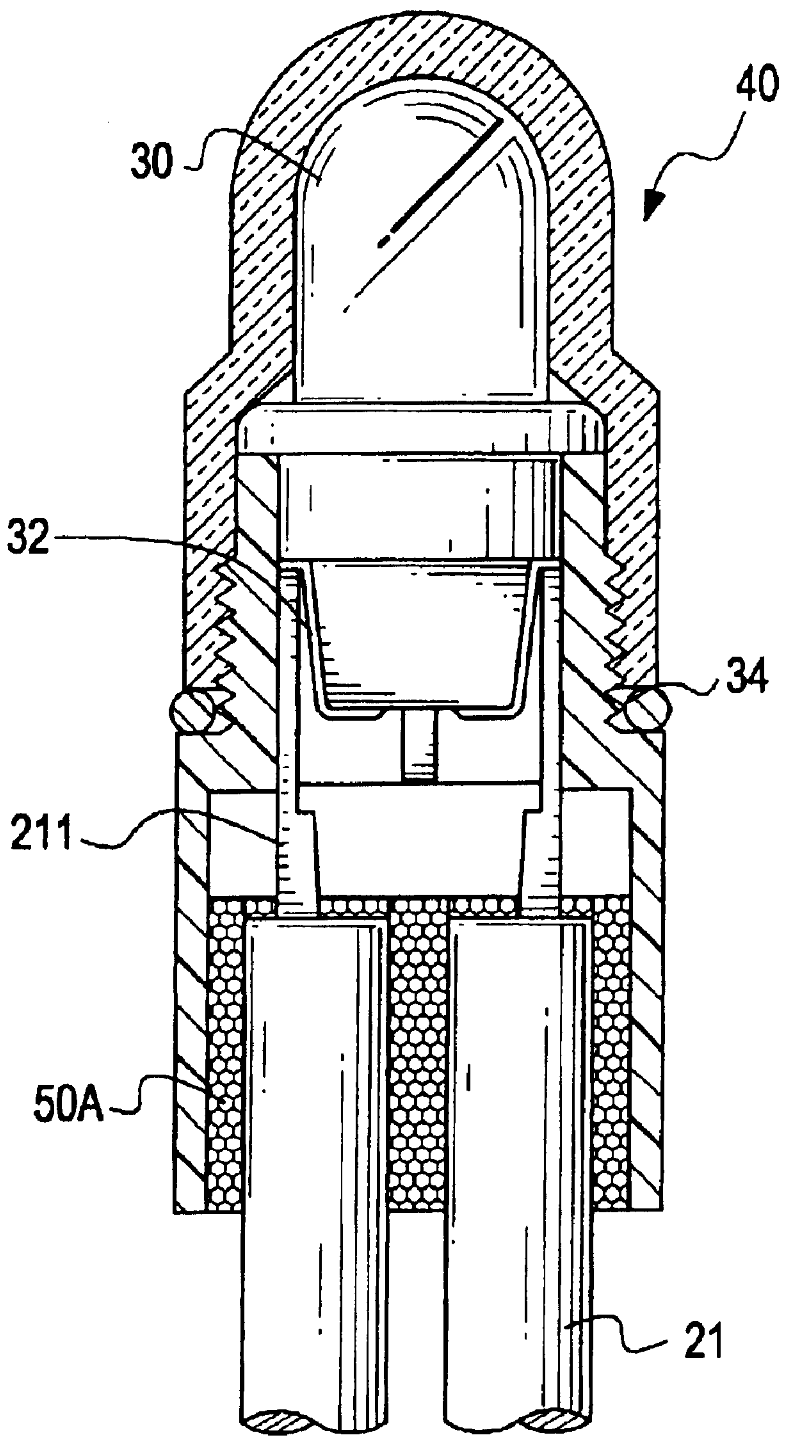
FIG. 7 is a schematic view showing the assembly of the plug in FIG. 6 with the socket.

With reference to FIGS. 6 and 7, the plug (50A) is made of rubber.

Figure 8:
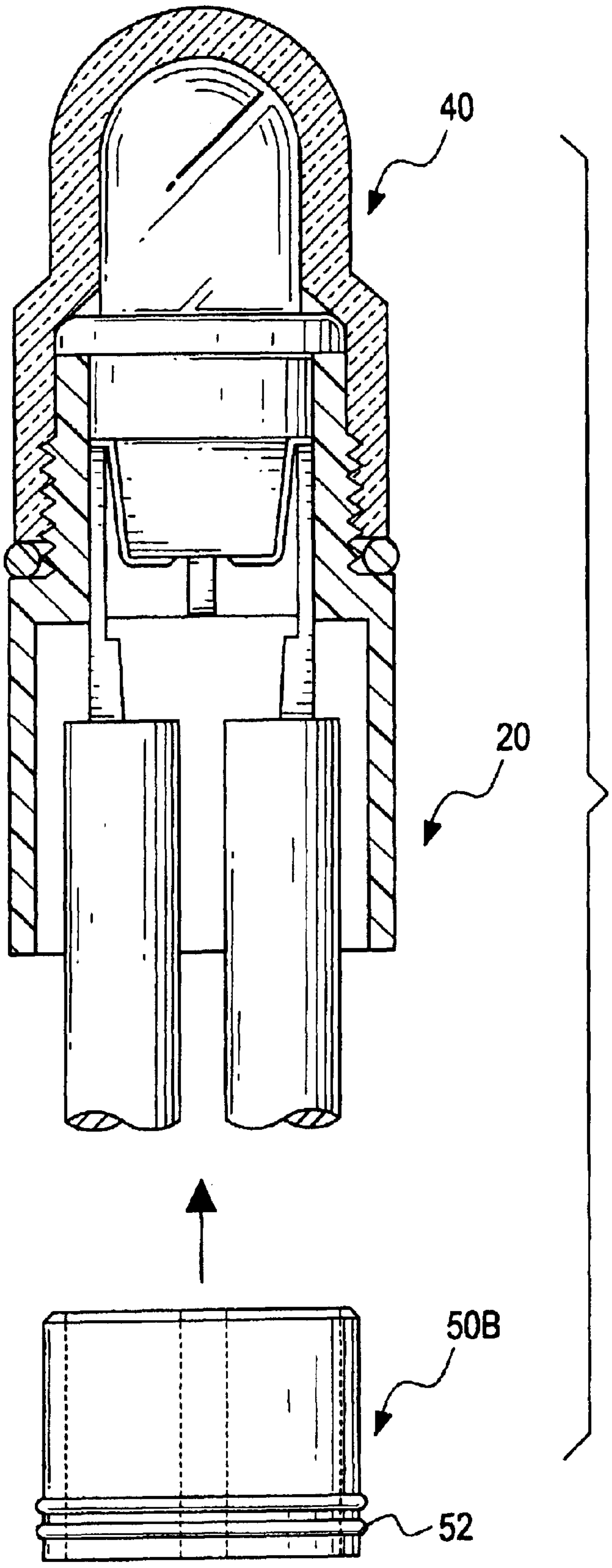
FIG. 8 is a schematic view showing still another embodiment of the plug of the present invention.
Figure 9:
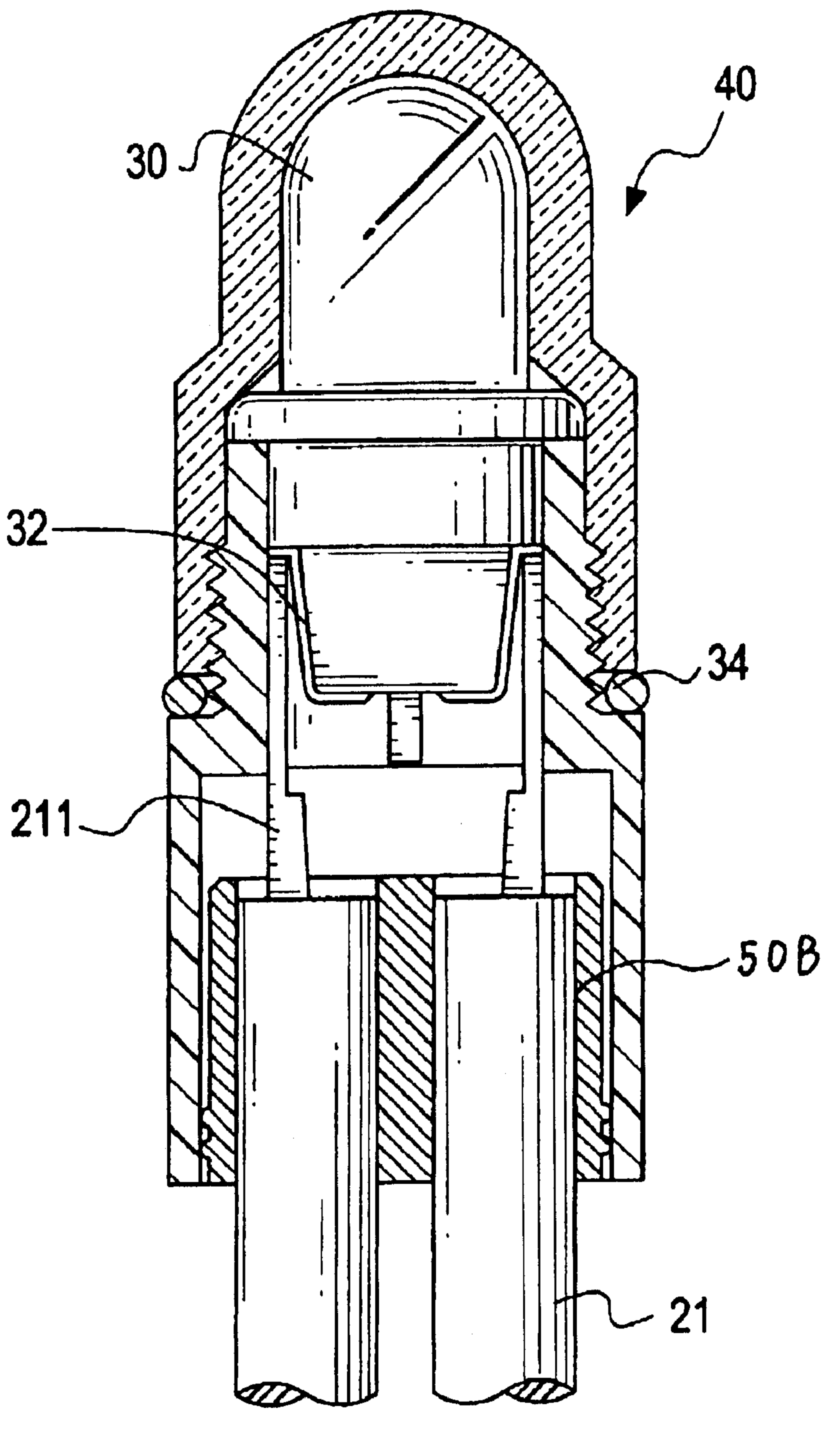
FIG. 9 is a schematic view showing the assembly of the plug in FIG. 8 with the socket.

With reference to FIGS. 8 and 9, it is noted that the plug (SOB) may have annular protrusions 52 formed on the outer periphery of the plug (50B). With the annular protrusions 52, not only the engagement between the inner periphery of the socket (20) is enhanced, but also the overflow glue (60) is stopped from flowing out of the socket (20). Thus, staining of the Christmas light bulb is avoided.

Figure 10:
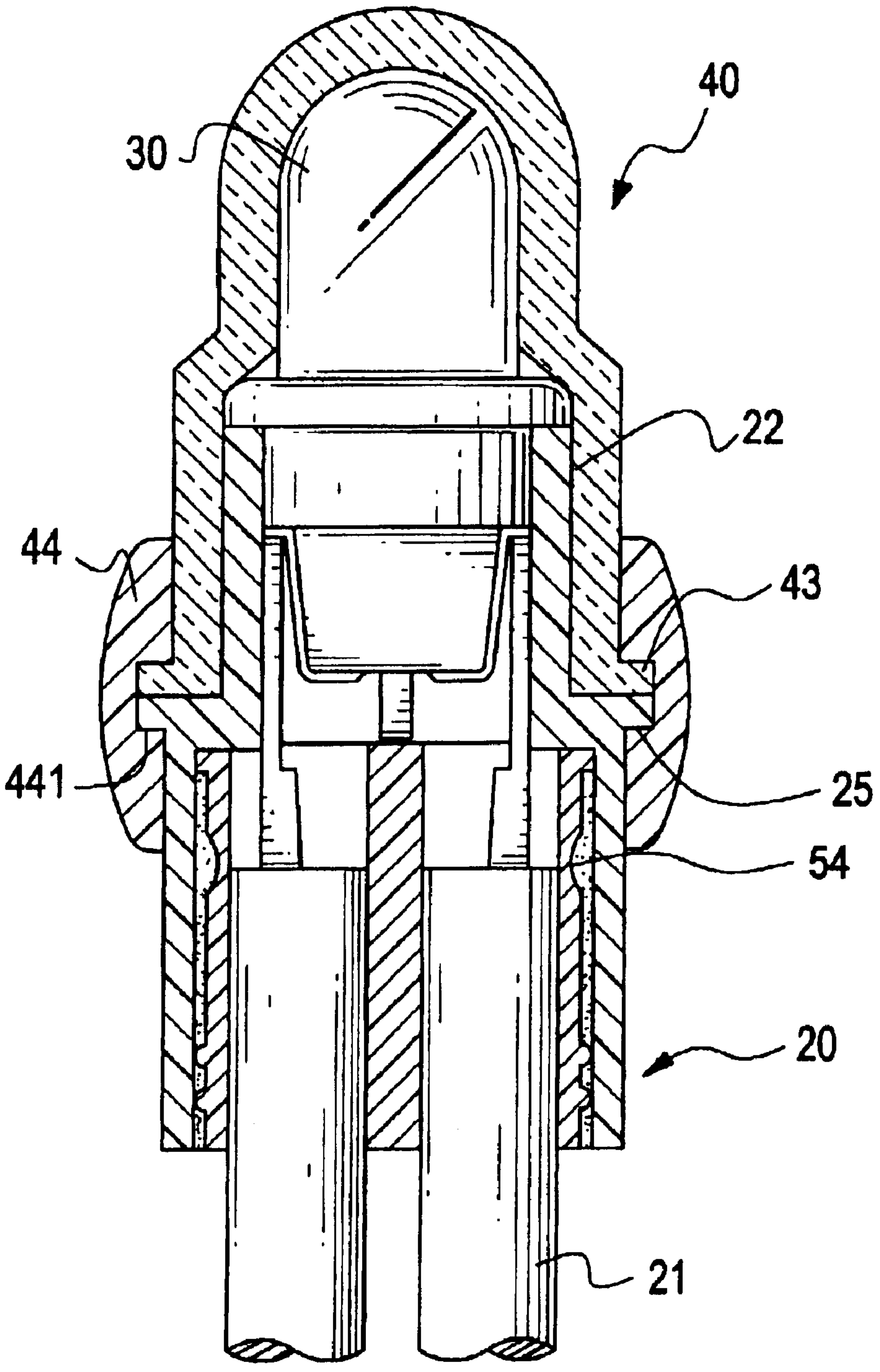
FIG. 10 is a schematic view showing another embodiment of the securing device of the present invention.

With reference to FIG. 10, it is noted that the enclosure (40) further has an upper ledge (43) formed on a bottom edge thereof, and a lower ledge (25) is formed on the step (23) to correspond to the upper ledge (43). A rubber band (44) defines therein a cutout (441) to receive both the upper ledge (43) and the lower ledge (25) after the enclosure (40) engages with the socket (20). Due to the upper ledge (43) and the lower ledge (25) being received, in the cutout (441), the engagement between the enclosure (40) and the socket (20) is waterproof.

Figure 11:
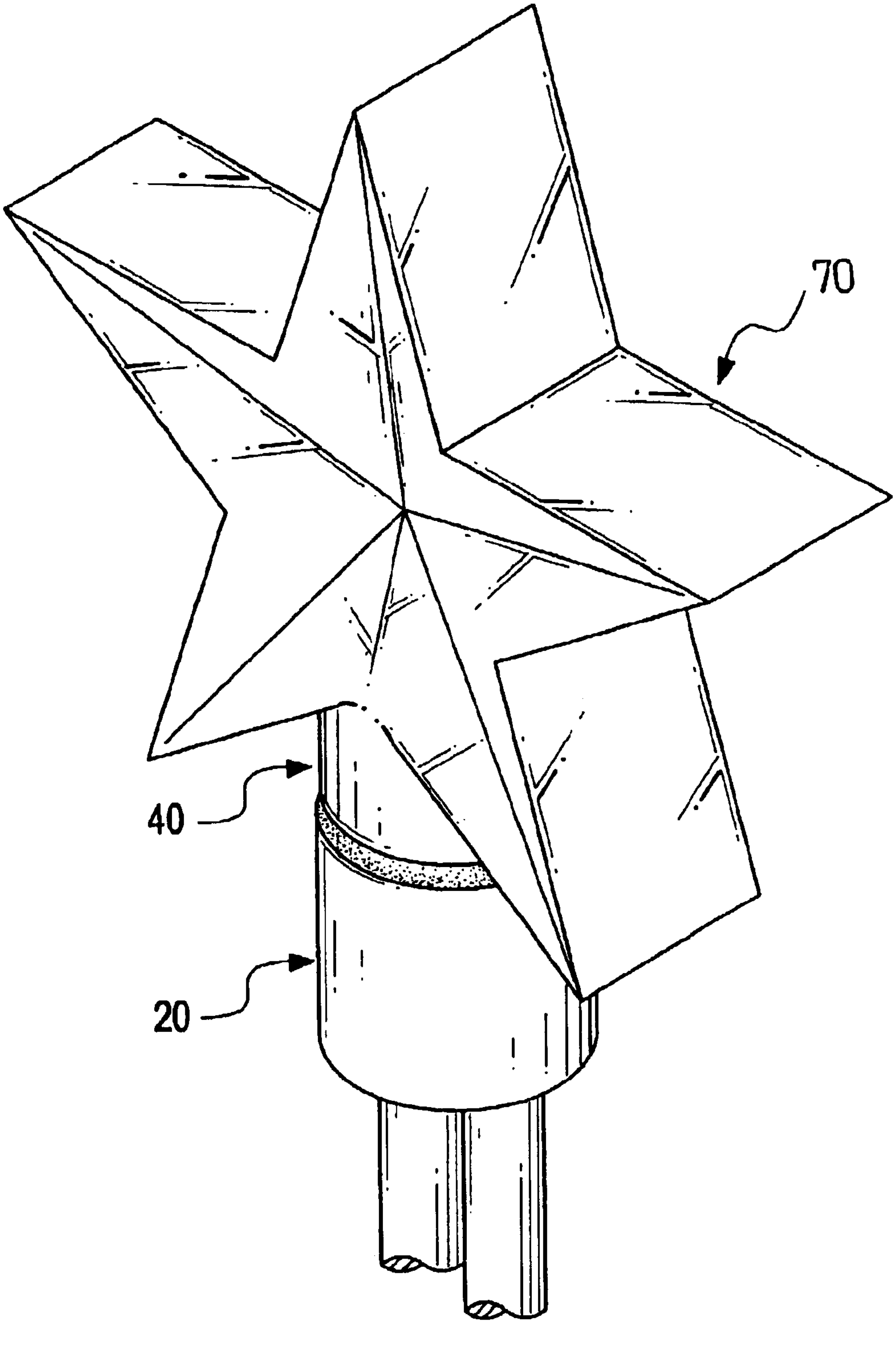
FIG. 11 is a perspective view showing that a cover is provided to the enclosure.

With reference to FIG. 11, the enclosure (40) has a cover (70) engaged with the enclosure (40) and having an engaging tube configured to receive therein a portion of the enclosure (40). It is noted that the cover (70) is star shaped so that when the bulb (30) is lit, the light is scattered through the star-shaped cover (70) to increase the attraction.

Figure 12:
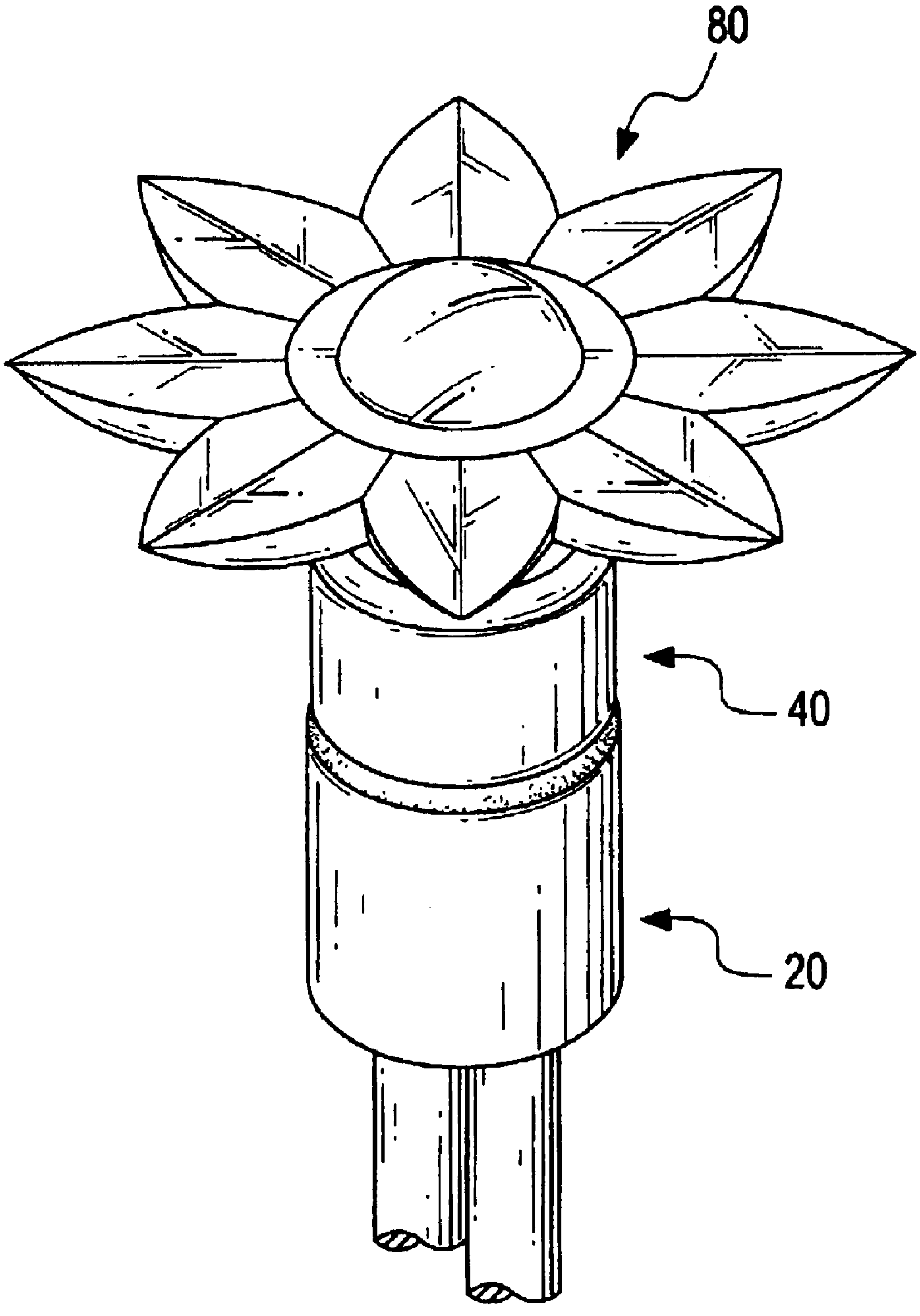
FIG. 12 is a perspective view showing still another embodiment of the cover of the present invention.

With reference to FIG. 12, the cover (80) is integrally formed on top of the enclosure (40). Although there is only instruction of two different shapes of the cover (70, 80), the cover (70, 80) may also include the shape of the head of a Santa Claus, a golf ball, etc.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A waterproof Christmas light bulb comprising:

a hollow socket having two cables received therein, two contacting plates respectively engaged with distal ends of the two cables and securely attached to an inner periphery of the hollow socket and a connection tube formed on top of the socket and having a diameter smaller than a diameter of the hollow socket so that a step is formed at a joint between the hollow socket and the connection tube;

a bulb partially received in the connection tube and having a flange formed to be supported by a top peripheral edge of the connection tube and two wires oppositely formed at a side of the bulb;

an O ring resting on and supported by the step;

an enclosure securely connected to the connection tube by a securing device so that the O ring is securely clamped between the enclosure and the step of the hollow socket to complete a waterproof engagement between the enclosure and the hollow socket; and a plug received in the hollow socket to have a waterproof engagement with the cables and the inner periphery of the hollow socket.

2. The waterproof Christmas light bulb as claimed in claim 1 further comprising a cover integrally formed with the enclosure.

3. The waterproof Christmas light bulb as claimed in claim 1 with the connection tube being integrally formed as a single piece with the socket of the same material and without an interconnection.

4. The waterproof Christmas light bulb as claimed in claim 1 further comprising a dividing plate integrally formed on a bottom of the bulb, with the securing device adjustably and securely connecting the enclosure to the connecting tube.

5. The waterproof Christmas light bulb as claimed in claim 1, wherein the securing device includes an outer threading formed on an outer periphery of the connection tube and an inner threading formed on an inner periphery of the enclosure so that when the outer threading and the inner threading are combined, engagement between the enclosure and the hollow socket is watertight.

6. A waterproof Christmas light bulb comprising:

a hollow socket having two cables received therein and two contacting plates respectively engaged with distal ends of the two cables and securely attached to an inner periphery of the hollow socket;

a bulb partially received in the hollow socket, with the bulb having two wires, with each wire oppositely formed at a side of the bulb and engaging with one of the two contacting plates; and a plug received in the hollow socket to have a waterproof engagement with the cables and the inner periphery of the hollow socket, wherein the plug has two through holes defined to correspond to the two cables, and at least one glue hole defined inside the plug to receive therein glue, wherein the at least one glue hole has a first end communicating with a side face of the plug and a second end communicating with a bottom of the plug.

7. The waterproof Christmas tight bulb as claimed in claim 6, wherein the plug is made of rubber.

8. The waterproof Christmas light bulb as claimed in claim 6, wherein the plug has annular protrusions formed on an outer periphery of the plug to stop overflow of the glue and an annular groove defined in an outer periphery of the plug to communicate with the first end of each of the at least one glue hole.

9. The waterproof Christmas light bulb as claimed in claim 6 further comprising:

a connection tube formed an top of the hollow socket and having a diameter smaller than a diameter of the hallow socket so that a step is formed at a joint between the hollow socket and the connection tube, with the bulb partially received in the connection tube and having a flange formed to be supported by a top peripheral edge of the connection tube, with the bulb further having a dividing plate integrally formed on a bottom of the bulb;

an O ring resting on and supported by the step; and an enclosure securely connected to the connection tube by a securing device so that the O ring is securely clamped between the enclosure and the step of the hollow socket to complete a waterproof engagement between the enclosure and the hollow socket.

10. The waterproof Christmas light bulb as claimed in claim 9, wherein the securing device includes an outer threading formed on an outer periphery of the connection tube and an inner threading formed on an inner periphery of the enclosure so that when the outer threading and the inner threading are combined, engagement between the enclosure and the hollow socket is watertight.

11. The waterproof Christmas light bulb as claimed in claim 9, wherein the plug has annular protrusions formed on an outer periphery of the plug to stop overflow of the glue and an annular groove defined in an outer periphery of the plug to communicate with the first end of each of the at least one glue hole.

12. The waterproof Christmas light bulb as claimed in claim 11, wherein the securing device includes an outer threading formed on an outer periphery of the connection tube and an inner threading formed on an inner periphery of the enclosure so that when the outer threading and the inner threading are combined, engagement between the enclosure and the hollow socket is watertight.

13. A waterproof Christmas light bulb comprising:

a hollow socket having two cables received therein, two contacting plates respectively engaged with distal ends of the two cables and securely attached to an inner periphery of the hollow socket and a connection tube formed on top of the socket and having a diameter smaller than a diameter of the hollow socket so that a step is formed at a joint between the hollow socket and the connection tube;

a bulb partially received in the connection tube, with the bulb having two wires, with each wire oppositely formed at a side of the bulb and engaging with one of the two contacting plates; and an enclosure securely connected to the connection tube by a securing device to complete a waterproof engagement between the enclosure and the hollow socket, wherein the securing device includes an upper ledge formed on a lower peripheral edge of the enclosure, a lower ledge formed on the step to correspond to the upper ledge and a rubber band applied to secure engagement between the upper ledge and the lower ledge.

14. The waterproof Christmas light bulb as claimed in claim 13 with the bulb having a flange formed to be supported by a top peripheral edge of the connection tube and a dividing plate integrally formed on a bottom of the bulb.

15. The waterproof Christmas light bulb as claimed in claim 13 further comprising:

a plug received in the hollow socket to have a waterproof engagement with the cables and the inner periphery of the hollow socket, wherein the plug has two through holes defined to correspond to the two cables, and at least one glue hole defined inside the plug to receive therein glue, wherein the at least one glue hole has a first end communicating with a side face of the plug and a second end communicating with a bottom of the plug.

16. The waterproof Christmas light bulb as claimed in claim 15 wherein the plug has annular protrusions formed on an outer periphery of the plug to stop overflow of the glue and an annular groove defined in an outer periphery of the plug to communicate with the first end of each of the at least one glue hole.

17. A waterproof Christmas light bulb comprising:

a hollow socket having two cables received therein, two contacting plates respectively engaged with distal ends of the two cables and securely attached to an inner periphery of the hollow socket and a connection tube formed on top of the hollow socket and having a diameter smaller than a diameter of the hollow socket so that a step is formed at a joint between the hollow socket and the connection tube;

a bulb partially received in the connection tube and having a flange formed to be supported by a top peripheral edge of the connection tube, two wires and a dividing plate, with each of the two wires being oppositely formed at a side of the bulb and with the dividing plate integrally formed on a bottom of the bulb;

an O ring resting on and supported by the step;

an enclosure securely connected to the connection tube by a securing device so that the O ring is securely clamped between the enclosure and the step of the hollow socket to complete a waterproof engagement between the enclosure and the hollow socket; and a plug received in the hollow socket to have a waterproof engagement with the cables and the inner periphery of the hollow socket, wherein the plug has two through holes defined to correspond to the two cables and at least one L shaped glue hole defined inside the plug to receive therein glue, wherein the at least one L shaped glue hole has a first end communicating with a side face of the plug and a second end communicating with a bottom of the plug.

18. The waterproof Christmas light bulb as claimed in claim 17, wherein the plug has annular protrusions formed on an outer periphery of the plug to stop overflow of the glue and an annular groove defined in an outer periphery of the plug to communicate with the first end of the at least one L shaped glue hole.

19. The waterproof Christmas light bulb as claimed in claim 17, wherein the securing device includes an outer threading formed on an outer periphery of the connection tube and an inner threading formed on an inner periphery of the enclosure so that when the outer threading and the inner threading are combined, engagement between the enclosure and the hollow socket is waterproof.

20. The waterproof Christmas light bulb as claimed in claim 17 further comprising a cover integrally formed with the enclosure.

* * * * *